June 20, 1972 P. C. VAN BEUSEKOM 3,671,236

PRESENSITIZED COLOR-PROOFING SHEET

Filed March 18, 1968

INVENTOR.
PHILIP C. VAN BEUSEKOM
BY Kinney, Alexander, Sell, Steldt & De La Hunt
ATTORNEYS United States Patent Office 3,671,236
Patented June 20, 1972

3,671,236

PRESENSITIZED COLOR-PROOFING SHEET

Philip C. Van Beusekom, St. Paul, Minn., assignor to Minnesota Mining and Manufacturing Company, St. Paul, Minn.

Filed Mar. 18, 1968, Ser. No. 713,836
Int. Cl. G03c *1/52, 7/16;* G03f *5/18*
U.S. Cl. 96—15 8 Claims

ABSTRACT OF THE DISCLOSURE

A light-sensitive color-proofing sheet for producing an image on various substrates. A light-sensitive continuous color layer is releasably attached to a carrier. Overlying the color layer is a water-insoluble transparent colorless barrier layer, to the opposite surface of which can be applied a pressure-sensitive adhesive. Upon lamination of the sheet to a substrate, and removal of the carrier, the color layer is formed into an image, photomechanically, by removal thereof in the non-image areas. Preferably the color coating is a pigmented polyvinyl formal resin, the light-sensitive component is a diazo resin (which may be in a separate coating or combined with the polyvinyl formal) and the barrier is a polyacrylate polymer.

Figure 1:
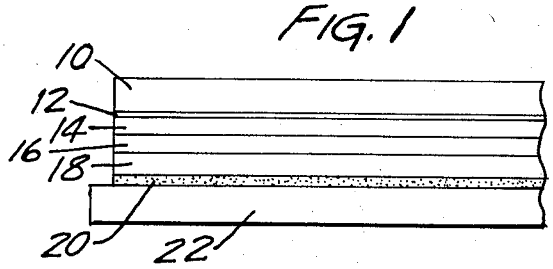

The present invention relates to the photomechanical production of images, in place, on varied substrates; and especially concerns the photomechanical production of multi-color images on a single sheet or substrate without printing. The invention has particular application in the proofing of color separation negatives preparatory to multi-color lithographic reproduction.

In printing pictorial matter, whether by lithography, letterpress or gravure, the half tone process is used, wherein the actual printing image is composed of thousands of minute dots per square inch of a single color ink of varied dot size or ink density. What the naked eye sees as shading in half tone prints is actually a controlled variation in size of dots relative to the unprinted areas between the dots. In black and white pictorial matter the dots are printed in black ink only. Full color reproductions, however, are necessarily printed in each of three colors, cyan, magenta, and yellow (known as "three color process"), or in these same colors with the addition of black ("four color process"). For each color a printing plate is made. In order to make the three or four printing plates, the original color picture or photograph is "separated" photographically, with the use of filters, masks, etc., into a set of three or four half-tone negatives, each representing one of the colors, and containing, dot for dot, the amount of that color which must be printed in order for composite three or four printed colors to produce the desired total color print.

The preparation of the color-separation negative is an art and requires considerable skill in handling the many variables to produce a desired result. Often trial and error is involved requiring correction or replacement of one or more of the negatives. Unless some reliable system is available to "proof" the negatives, the printing press must be set up and copy printed just to secure preliminary proofs. This is time consuming and expensive.

The present invention provides accurate means for proofing the negatives without printing.

One system for proofing color separation negatives which has become popular in recent years is disclosed in Larson Pat. No. 3,136,637, granted June 9, 1964, on application filed on November 26, 1958. Therein a light-sensitive transparent sheet is provided for each of the colors to be printed. Each of the sheets is exposed through its respective color separation negative. Upon processing the color in the non-image areas is removed, yielding a sheet which contains the desired color pattern in the image areas, while being colorless and transparent in the non-image areas (e.g. between halftone dots). After each of the separate sheets is made, they are assembled together in registry on a white background, whereupon a color proof results.

The entire proofing procedure is accomplished within a few minutes. Where a correction of one or more color negatives is shown from the proof to be necessary, a new proof sheet of the corrected negative is exposed and processed, and substituted into the composite, for reproofing.

While the just described Larson system of color proofing has enjoyed considerable acceptance, a number of inherent drawbacks nonetheless exist. For example, the laying up of the multiplicity of sheets requires that the viewer look through a plurality (three or four) transparent films during the proofing operation. Since the composite is made of several separate sheets extreme care is required to maintain registry. If the individual sheets are not perfectly colorless and transparent in the optical sense, any "haze" or imperfection present is multiplied in the several sheets. Additionally, incident light reflects from the several sheets imparting a gloss which is not truly representative of printed copy, thus introducing a need for interpretation in evaluating the proof.

The present invention is in the nature of an improvement in the proofing system described in the aforesaid Larson patent. It utilizes benefits of the system, without the attendant disadvantages just described. In my invention photo-mechanically produced images corresponding with each color are integrally built up on a single substrate (much as occurs in the actual printing operation itself) without need of a printing operation. The multiplicity of carrier films is eliminated.

Figure 2:
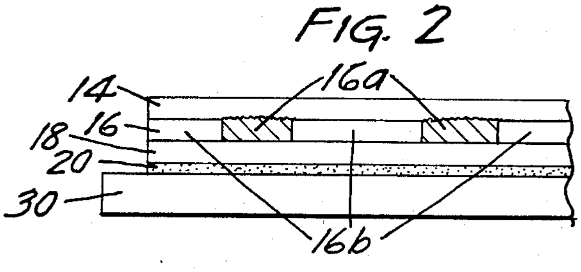
Figure 3:
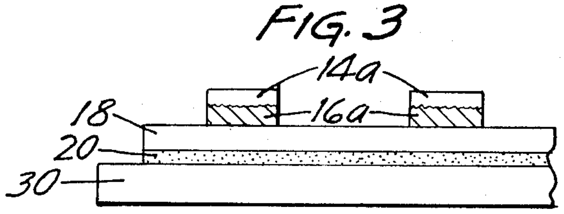

The manner in which my invention functions will be apparent from reference to the drawing, and to the specific examples which follow. In the drawing, FIG. 1 shows a broken away edge view of a photo-sensitive color proofing sheet. FIG. 2, likewise a broken away edge view, shows the structure of FIG. 1 following lamination to a substrate, and removal of the carrier sheet, and after light exposure through a negative. FIG. 3 shows the structure of FIG. 2, after development of the image on the substrate.

Referring to FIG. 1, a carrier sheet 10 is provided with a release surface 12, which may either be a smooth surface of the carrier itself, or a surface coating thereon. Overlying the surface 12 and in intimate clinging engagement therewith, but not adhesively bonded thereto, is a color coating 14 formed, for example, of a pigmented organophilic water-insoluble solvent-softenable resinous polymer. Coated over and in contact with the color-coating is a light-sensitive diazo resin layer 16. The color coating 14 and light-sensitive layer 16 are intimately associated and adherently bonded together (and in certain constructions can actually be combined to a single layer) The light-sensitive layer is soluble in a solution which softens and/or partially dissolves the color coating.

Overlying the light-sensitive layer 16 is a continuous solvent-resistant resinous protective film or layer 18 to the exposed surface of which is applied a very thin layer 20 of adhesive, e.g. pressure-sensitive adhesive. The outer pressure-sensitive surface of the adhesive can be protected from contamination by dirt or grease, by a protective release liner 22.

In applying the structure of FIG. 1 to a substrate 30, such as white paper (FIG. 2), the protective liner 22 is first stripped from the adhesive surface and the entire structure is laminated for example, by rolling, onto the substrate 30. Thereafter, the carrier sheet 10 is stripped from the structure, the bond to the paper and the adhesion between the several layers being greater than the non-adhesive clinging engagement between the carrier sheet 10 and the color coating 14. Following the removal of the carrier, the remaining structure, now bonded to the substrate, is exposed to ultraviolet light through the appropriate color separation negative corresponding with the color of coating 14. In the light struck areas, the ultraviolet light passes through the color coating (which is transparent thereto) and exposes and insolubilizes the light-sensitive material in areas 16*a*. A firm bond between the light reacted material and the under-and over-lapping coatings occurs. Areas 16*b* remain light-sensitive.

Thereafter the sheet is processed with processing solvent selected with respect to the particular material of which layer 14 is composed (and which contains a solvent for the unexposed diazo), to develop the image and yield the structure of FIG. 3. The color coating and the sensitizer in the non-light struck areas is removed, leaving the color image in areas 14*a* anchored to the underlying layer 18 by the light-reacted diazo in exposure areas 16*a*. During processing the layer 18 serves as a barrier which protects the substrate (and adhesive) from solutions used during the processing.

It is to be noted that the purpose of the drawing is partly for illustrative purposes only and it is not intended that the various layers and components be shown in their true dimensions or proportions. Actually the layers, especially the barrier layer and adhesive, are extremely thin and virtually imperceptive to the naked eye viewing the substrate. In preferred embodiments, the entire structure, after stripping of the temporary carrier, is only in the order of one ten thousandth inch in thickness.

Following the above described photomechanical production of the first color image on the substrate, for example cyan (blue), similar sheets but containing the yellow, magenta and black color coatings are successively applied and the images produced over the structure illustrated in FIG. 3 to yield a four color proof.

Having thus described my invention generally, it will now be specifically illustrated with the aid of the following specific examples:

EXAMPLE I

A 2-mil film of smooth-surfaced biaxially oriented polyethylene terphthalate polyester is first coated with a polyvinyl alcohol solution constituted as follows:

| | Parts by wt. |
|---|---|
| Polyvinyl alcohol (available commercially as Elvanol 71–30) | 2.5 |
| Glycerin | 0.5 |
| Water | 97 |

A dry coating weight of 75 mg./ft.$^2$ provides a satisfactory release layer. The release layer surface is oven dried and then overcoated with a resin solution containing a suitable transparent pigment, in this instance a phthalo cyanine pigment, e.g. "Monastral Blue BT 284–D."

The coating solution is prepared by first dispersing the pigment into 1,1,2-trichloroethane solvent, and adding polyvinylformal resin (Formvar 15/95 S), the amount of the ingredients being adjusted to yield a mix having 65 parts resin, 35 parts pigment, and 900 parts solvent. This mix is appropriately milled. The resultant mill base is then diluted by adding further solvent to yield approximately a 3 percent solution. This pigmented-resin coating solution or dispersion is applied over the dried release layer at a dry coating weight of about 50–70 milligrams per square foot. The coated sheet construction is oven dried as before to evaporate the solvent.

The polyvinyl formal coated side of the sheet is then primed by a corona discharge treatment, sufficient to render the surface of the film water-wettable.

A solution of a light-sensitive diazo resin or equivalent is then coated over the primed surface of the sheet. A preferred diazo resin is the condensation product of p-diazodiphenylamine and formaldehyde, prepared, for example, in accordance with the method described in Jewett and Case Pat. No. 2,714,066. A solution of the pure diazo resin, for example, 4 parts resin dissolved in 48 parts water and 12 parts methanol, is made up.

The preparations of the light-sensitive diazo resin are carried out under subdued light, for example, under a yellow light. This is also true of the other operations involving the coating of the sheet with the light-sensitive resin and subsequent handling of the sensitized sheet prior to exposure and development.

The solution of the light-sensitive diazo resin just described may be applied over the primed polyvinylformal layer by roll-coating or by dipping the sheet into the solution of the resin. It is preferred that the diazo coating be a thin one, a residue of about 6–8 milligrams of the diazo resin per square foot of area being satisfactory, although the precise amount is not particularly critical. The sheet is then dried at room temperature, or at slightly elevated temperatures if desired. A barrier is applied over the diazo layer, by coating a two percent weight solution in methyl ethyl ketone of a 3:1 weight ratio of poly acrylate ("Elvacite 2044") and a polyvinyl chloride-acetate copolymer ("Vinylite VAGH") at a dry coating weight of 160 mg./ft.$^2$.

A clear colorless pressure-sensitive adhesive (e.g. as disclosed in Ulrich Pat. Re. 24,906, granted Dec. 13, 1960) is coated on the acrylate surface at a dry coating weight of 200 mg./ft.$^2$. This coating weight is quite thin in relation to amounts applied in making conventional pressure-sensitive adhesive structures. Following drying, a protective liner of polyethylene coated paper is placed against the adhesive to facilitate handling of the sheet and to protect the adhesive from dirt, etc. In this form the light-sensitive sheet can then be converted into standard sizes, packed in suitable light-proof containers and shipped in commerce.

In the foregoing illustration, a cyan color proofing sheet is described. The companion magenta, yellow and black structures (which, together with the cyan sheet, constitute a complete four-color proofing system) are similarly prepared employing the same polyvinylformal resin coating, but incorporating appropriately colored pigments, for example, "Watchung Red RT 761–D," "Benzidine Yellow YT 564–D," and Cabot "Regal 300 R" carbon black. Pigments are selected and pigment/resin ratios established generally to provide the same color-density as would result from the printing ink of corresponding color being used on the job being proofed. The sheets can be stored in sensitized condition, and then used weeks or months later as successfully as immediately following manufacture. In using the sheets in producing a color proof composite any desired substrate can be used. Frequently the sheet stock on which the printing job will be performed is used. This is particularly advantageous when the printing stock is something other than white paper, such as colored paper, card stock or paperboard, plastic film or metal foil. Where the printing stock is to be white paper, I prefer to assemble the proof on a bright white stock to provide optimum viewing conditions. A particularly suitable backing, because of dimensional stability, whiteness, and moisture proofness, is "3M" Brand "Scotchprint" printing stock.

In preparing a color proof composite, the colors are processed individually and consecutively. A sheet of the color represented by the first negative to be proofed, preferably cyan (to minimize halation), is prepared for processing by removing the adhesive protective sheet and laminating the color sheet to the backing sheet. Pressure applied by hand with a rubber roller is sufficient to achieve lamination through the pressure-sensitive adhesive. Following lamination the support sheet of polyethylene terephthalate is stripped away. The light sensitive layer now on the backing sheet is contact exposed through the corresponding color separation negative.

The light-imaged backing is then physically developed with a solution of normal propanol-water in a 1:1 volume ratio brushing and wiping with a soft cloth pad to remove the pigmented resin and unexposed sensitizer layers from the non-image (unexposed) areas to leave the latter clear and colorless. Thereby an image is defined, faithfully representing the reproduction and full color range which would result if the complete platemaking and printing operation (using appropriately matched ink), were carried through with that color separation negative.

A sheet of the second color to be proofed, preferably yellow, is prepared in the same way by removing the adhesive protective sheet and laminating to the cyan imaged backing sheet. The corresponding color separation negative must now be positioned in exact register with the cyan image. This is commonly provided for by a preregistration of all the separation negatives and the backing sheet by a system of register marks or punches. The light-sensitive layer now on the cyan-imaged backing sheet is exposed and processed, as for the first color. The remaining magenta and black images are thereafter added, in turn, thus faithfully reproducing the four color result which would occur in printing, were printing plates employed prepared from the same color separation negatives.

Certain necessary relationships exist between the elements of the construction just described. Adhesive relationships must be such that, after adhesive lamination to the backing sheet, the release layer will allow stripping away the carrier layer without disrupting the adhesive bond. Failure must not occur at either the adhesive-backing sheet or adhesive-barrier layer bonds. While it is not particularly critical whether release occurs between carrier-layer-release layer or release layer-color layer, release is generally less efficient between two in situ formed layers, resulting in somewhat more likely release between carrier layer and release layer. In this event, it is of importance that the release layer be transparent and soluble in the developing solution.

With regard to the selection of the resin of the color coat and to the solution used to develop the image, reference is again made to Larson Pat. No. 3,136,637, where numerous organophilic hydrophobic water-insoluble solvent-softenable resinous polymers are disclosed, along with suitable developing solutions. It is therein discussed that upon light-exposure of the structure, a firm in situ bond is formed between the resin and the diazo in the light-struck areas, while permitting the resin to be removed upon light rubbing treatment with the appropriate developing solution. The present invention avails itself of these principles. Unlike Larson, however, for a given color coat due regard must be had to its relation to other elements present in my novel combination structure which are not there disclosed.

Inasmuch as the light-sensitive layer is extremely thin and discontinuous, the color-coat and the barrier layer contact one another in the structure and their inter-relation is important. The bond formed between them (or any intermixing occurring at the interface) must not be such as to prevent the color-coat from being removed in the non-light struck areas during development. As indicated above, whatever natural bond exists is strengthened in situ upon light reaction of the diazo to give a strong bond preventing removal in those areas upon development. It has been found that the desired relation is present where at least a degree of physical incompatability exists between the resins comprising the color and barrier layers. In this regard, note that the "Formvar" and the "Elvacite" employed in the above example, do not yield a continuous film if coated from a common solvent and dried.

Further in this regard, during the coating operations best results are obtained where a later applied layer is cast from a solvent which does not dissolve prior layers.

In the preceding example, the color-coating and the diazo resin were applied in separate steps from different solvents. As more specifically described in the following example, the color coat and the light-sensitive coat can be applied as a single coating. Care must be exercised that pigments are not selected, such as metal salts, which may react with and destroy the light-sensitive material.

EXAMPLE II

A light-sensitive resin, which is initially soluble in an organic solvent, is first prepared. An aqueous solution of the p-diazodiphenylamine-formaldehyde resin utilized in the structure of Example I, and described with specificity in Jewett and Case Pat. No. 2,714,066 is added to a chemical equivalent, based on the resin content of the solution, of tri-isopropyl naphthalene sulfonic acid. By a reaction between the resin and the acid, the tri-isopropyl naphthalene sulfonate salt of the resin is formed and precipitates out of the aqueous medium as a brownish yellow solid. The reaction product is separated by filtration. A 3 percent weight solution of the light-sensitive resinous product just described is prepared in a mixed solvent of methyl Cellosolve and MEK in a 4:3 weight ratio. Equal volumes of this sensitizer solution and a 1.5 percent solution (by weight) of the pigmented polyvinylformal resin solution of Example I are well mixed. This light-sensitive pigmented resin layer is coated over the release layer coated carrier layer as in previous example, followed by the barrier layer coating, composed and applied as in Example I.

The light-sensitive sheet just described, having no adhesive coating, can be exposed from either side before lamination to the substrate. Or if coated with an adhesive, it is laminated and then exposed and processed as in Example I.

EXAMPLE III

A carrier layer as in Example I is coated consecutively with a release layer, a pigmented resin layer, a sensitizer layer and a barrier resin layer, except that an opaque blue pigmented resin coating is used, prepared as follows:

| | Parts by wt. |
|---|---|
| Blue pigmented ("Monastral Blue BT 284 D") | 2 |
| Red pigment ("Watchung Red RT 698 D") | 1 |
| Titanium dioxide opacifier ("Unitane OR 350") | 3 |
| Polyvinylformal resin ("Formvar 15/95S") | 6 |

The pigmented are dispersed into 1,1,2-trichloroethane solvent and the resin is added to yield a mix of about 10% solids by weight comprising equal parts of resin and total pigment. This mix is appropriately milled and then diluted with further solvent to yield an approximately 3 percent coating solution. As in Example I, the pigmented resin coating is primed by a corona discharge treatment to provide a water-wettable surface before sensitizer coating. This opaque blue proofing sheet is used to proof a "spot color" blue and black box board printing job. Opaque color is needed to prevent the box board color from showing through, and the exact shade of blue desired can be adjusted by appropriate choice and proportions of pigmented.

The light-sensitive layer is exposed before transfer, through the barrier resin layer and through an appropriate negative. The exposed color sheet is prepared for transfer by coating with an adhesive such as Krylon pressure-sensitive spray adhesive No. 8010 (Krylon, Inc., Norristown, Pa.). The color sheet is laminated to the box board backing sheet, support sheet stripped away, and color image developed as in the previous example. It is particularly noted that the barrier layer acts as a moisture-proofing layer during development in addition to its primary function as a barrier and bonding layer between the light-sensitive layer and adhesive layer.

Since there is to be black printing as well as the blue "spot color" to be proofed, a black color sheet is prepared as in Example I, omitting the adhesive layer and adhesive protective seet. The single black pigment without opacifier, as used in Example I, is sufficiently opaque for this purpose. The black color sheet is exposed through the barrier resin layer, adhesive coated, laminated to the blue-imaged backing sheet and processed as described before. In this procedure it is important that the negatives, color proof sheets and backing sheet all be pre-registered so that the lamination of the image-exposed color sheets will result in proper image registration. Somewhat more margin for registration error is allowable for "spot color" than for process color, making exposure-before-transfer not only possible but preferable in some cases.

In describing the present invention, I am aware of such prior art as that involving photographic diffusion transfer, decalcomania transfer, dye diffusion transfer (e.g. U.S. 3,275,437), dry strip transfer (e.g. U.S. 3,276,933), and colloid or pigment transfer (see U.S. 3,091,528). In each of these, an image is transferred from one substrate to another, as indeed is also true of printing itself. The present invention differs from these prior art processes in a basic sense in that it is not an image as much which is transferred, but rather a complete imageable layer. Even in those cases where image-wise exposure takes place before transfer, the entire imageable layer is transferred.

That which is claimed is:

1. A presensitized color-proofing sheet comprising a carrier sheet having a smooth release surface, a continuous color coating of pigmented organophilic hydrophobic water-insoluble resinous polymer softenable and/or partially dissolvable in a solvent developing medium, said color coating being in intimate clinging engagement with but not adhesively bonded to said release surface, a light-sensitive diazo resin soluble in said solvent developing medium directly associated with said color coating, said direct association being at least one of the following:

(a) the incorporation of said diazo resin in the color coating to form a single layer; and (b) the incorporation of said diazo resin in a separate but contiguous layer from the color coating layer, a continuous, water-insoluble, transparent, colorless barrier layer bonded on one surface over said color coating and said diazo resin, said barrier layer being insoluble in said solvent developing medium, the diazo resin becoming insolubilized and firmly bonding said color layer to said barrier layer in the light-struck areas upon light exposure of said sheet, the color layer and diazo resin being readily removable from said barrier layer in areas not light exposed.

2. The presensitized sheet of claim 1 wherein a transparent colorless pressure-sensitive adhesive layer is bonded to the surface of said barrier layer away from said color coating and diazo resin.

3. The presensitized sheet of claim 1 wherein the coloring coating and the diazo resin are contiguous layers.

4. The presensitized sheet of claim 1 wherein the color coating and the light-sensitive diazo resin are intermixed in a single layer.

5. The presensitized sheet of claim 1 wherein said color coating comprises a pigmented polyvinyl formal resin.

6. A presensitized sheet of claim 2 wherein a release liner is bonded to said pressure-sensitive adhesive layer.

7. A method for obtaining a multi-colored color proofing sheet image on one substrate comprising:

(1) bonding a first presensitized sheet of claim 1 to a substrate by a force greater than said clinging engagement of said color coating to said carrier sheet, (2) removing said carrier sheet, (3) exposing said presensitized sheet through a color separation negative corresponding to said color coating whereby exposed diazo resin is rendered insoluble in said solvent developing medium to create a latent image, (4) developing said image with said solvent developing medium whereby unexposed diazo resin and color coating associated therewith is removed, (5) bonding a second presensitized sheet of claim 1 to the developed first presensitized sheet, (6) repeating steps (2)–(4), and (7) repeating steps (5), and (2)–(4) in that order for further presensitized sheets of claim 1, each of said color proofing sheets being of a different color, whereby there is provided said multi-colored proofing sheet on one substrate.

8. A presensitized color-proofing sheet comprising a carrier sheet having a smooth release surface, a continuous color coating of pigmented organophilic hydrophobic water-insoluble resinous polymer softenable and/or partially dissolvable in a solvent developing medium, said color coating being in intimate clinging engagement with but not adhesively bonded to said release surface, a light-sensitize diazo resin soluble in said solvent developing medium directly associated with said color coating, said direct association being at least one of the following:

(a) the incorporation of said diazo resin in the color coating to form a single layer; and (b) the incorporation of said diazo resin in a separate but contiguous layer from the color coating layer, a continuous, water-insoluble, transparent, colorless barrier layer bonded on one surface over said color coating and said diazo resin, said barrier layer being insoluble in said solvent developing medium, a pressure-sensitive adhesive layer bonded to the surface of said barrier layer away from said color coating and diazo resin, and a release liner bonded to said pressure-sensitive adhesive layer, the diazo resin becoming insolubilized and firmly bonding said color layer to said barrier layer in the light-struck areas upon light exposure of said sheet, the color layer and diazo resin being readily removable from said barrier layer in areas not light exposed.

References Cited

UNITED STATES PATENTS

| | | | |
|---|---|---|---|
| 2,327,304 | 8/1943 | Grant | 96—15 |
| 2,385,599 | 9/1945 | Ball et al. | 96—15 |
| 2,409,564 | 10/1946 | Heinecke et al. | 96—83 |
| 2,528,395 | 10/1950 | Slifkin | 96—75 |
| 2,760,863 | 8/1956 | Plambeck | 96—83 X |
| 3,136,637 | 6/1964 | Larson | 96—33 X |
| 3,157,501 | 11/1964 | Burrows et al. | 96—36 X |
| 3,168,402 | 2/1965 | Branibar | 96—83 |
| 3,258,337 | 6/1966 | Cousins | 96—35 |
| 3,307,950 | 3/1967 | Appelbaum | 96—83 |
| 3,481,736 | 12/1969 | Ruff | 96—28 |

CHARLES L. BOWERS, Jr., Primary Examiner

U.S. Cl. X.R.

96—14, 30, 35, 36, 75, 83